(12) United States Patent
Durand (10) Patent No.: US 8,131,996 B2
(45) Date of Patent: Mar. 6, 2012

(54) DISTRIBUTED MANAGEMENT OF A CERTIFICATE REVOCATION LIST

(75) Inventor: Alain Durand, Rennes (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 1371 days.

(21) Appl. No.: 11/119,391

(22) Filed: Apr. 29, 2005

(65) Prior Publication Data

US 2005/0257046 A1    Nov. 17, 2005

(30) Foreign Application Priority Data

May 3, 2004  (EP) .................................... 04291124

(51) Int. Cl.
*H04L 9/32* (2006.01)

(52) U.S. Cl. ........ 713/158; 713/150; 713/155; 713/156; 713/157; 726/9

(58) Field of Classification Search .................. 713/150, 713/155–158; 726/9
See application file for complete search history.

(56) References Cited

U.S. PATENT DOCUMENTS

| | | | |
|---|---|---|---|
| 5,793,868 | A | 8/1998 | Micali |
| 6,487,658 | B1 | 11/2002 | Micali |
| 7,120,607 | B2 * | 10/2006 | Bolle et al. ................... 705/64 |
| 2002/0073310 | A1 * | 6/2002 | Benantar ....................... 713/156 |
| 2003/0221097 | A1 * | 11/2003 | Nakano et al. ................ 713/150 |
| 2004/0190389 | A1 * | 9/2004 | Nakano et al. ............. 369/30.03 |
| 2005/0138401 | A1 * | 6/2005 | Terao et al. ................... 713/189 |

FOREIGN PATENT DOCUMENTS

| | | | |
|---|---|---|---|
| JP | 1163871 | A | 6/1989 |
| JP | 11340968 | A | 12/1999 |
| JP | 2001-512589 | T | 8/2001 |
| JP | 2005341552 | * | 12/2005 |
| WO | 0141359 | A1 | 6/2001 |

OTHER PUBLICATIONS

Housley et al., "Internet X.509 Public Key Infrastructure Certificate and Certificate Revocation List (CRL) Profile", Network Working Group, Apr. 2002, pp. 1-121.*
Menezes et al., "Handbook of Applied Cryptography", 1997, CRC Press, Chapter 9.*
EPO Search Report dated Nov. 9, 2004, regarding EP Application No. 04291124.8-1237 (5 pages).
EPO Search Report dated Jul. 12, 2005, regarding EP Application No. PCT/05103438.7-2415 (3 pages).
Japanese Office Action for Application No. 2005-128013, mailed on Jan. 7, 2011.
Peter Gutmann, "PKI: It's not Dead, Just Resting," Computer, Aug. 2002, vol. 35, Issue 8, p. 41-49.

* cited by examiner

*Primary Examiner* — Tongoc Tran
(74) *Attorney, Agent, or Firm* — Osha • Liang LLP (57) ABSTRACT

In a method for managing a Certificate Revocation List (CRL), a first device (31, 61) receives the CRL (33, 67) which comprises at least one revoked certificate identifier ($SN_i$). An integrity field ($MAC_i$) associated to an entry of the CRL ($37_1, \ldots, 37_p$) is calculated using a secret data ($K_{CRL}$), wherein an entry comprises at least one revoked certificate identifier of the CRL. The entry and its associated calculated integrity field are transmitted to a second device (32, 62), distinct from the first device and are stored into the second device. The method further comprises checking a validity of a certificate.

28 Claims, 7 Drawing Sheets

DISTRIBUTED MANAGEMENT OF A CERTIFICATE REVOCATION LIST

BACKGROUND OF INVENTION

1. Field of the Invention

The present invention relates to secure digital networks.

2. Background Art

The transmission of digital data representative of contents through a communication network poses problems of protection of the data exchanged and of management of permissions or prohibitions to copy the data.

To remedy these problems, manufacturers of multimedia hardware have proposed solutions making it possible to transmit contents in digital form while preventing the illicit copying of these contents. These solutions generally involve the use of cryptographic systems in which one or a plurality of keys is generated by a trusted party, e.g. a certifying authority, as well as the use of so-called compliant appliances or modules. Each key is associated to a certificate. The certificate cryptographically binds the key to an identity of its owner.

It may happen that a key or a compliant appliance or module containing a secret is pirated. In the former case, a "pirate" succeeds in obtaining the key. In the latter case the "pirate" obtains the secret.

One example of a secure digital network is a system for secure digital broadcasting of content.

It is known in a system for secure digital broadcasting of content to manage a revocation list containing identifiers of keys, of appliances or of modules that are no longer regarded as compliant by the trusted third party since the latter has become aware of the fact that they have been pirated.

The revocation list must be communicated to all participants in the system so that the keys, appliances or modules that are no longer compliant can be identified and no longer be used. For example, the compliant appliances of the system will refuse to communicate with a non-compliant appliance or with an appliance transmitting a non-compliant key.

In order for this to be effective, it is necessary for the compliant appliances to always have access to the revocation list.

More specifically, the revocation list may contain a list of certificates that may not any more be trusted. Such a list is also known as Certificates Revocation List (CRL).

A CRL typically comprises a list of entries. In order to be uniquely identified the CRL is dated and signed by the CRL issuer, e.g. by the trusted third party. Each entry of the CRL may comprise a serial number of a certificate to be revoked and a revocation date.

A device used in the secure digital network may have restrictions on its hardware specifications. Such a device may not have sufficient memory and/or processing capacities to store an entire CRL in its memory and process the CRL stored in its memory to check whether a key, i.e. the certificate associated to this key appears in the CRL. An example for such a device is the widespread smartcard that carries an electronic circuit comprising a memory and a processing unit. Smartcards are frequently used to perform encrypting or decrypting of data.

Figure 1:
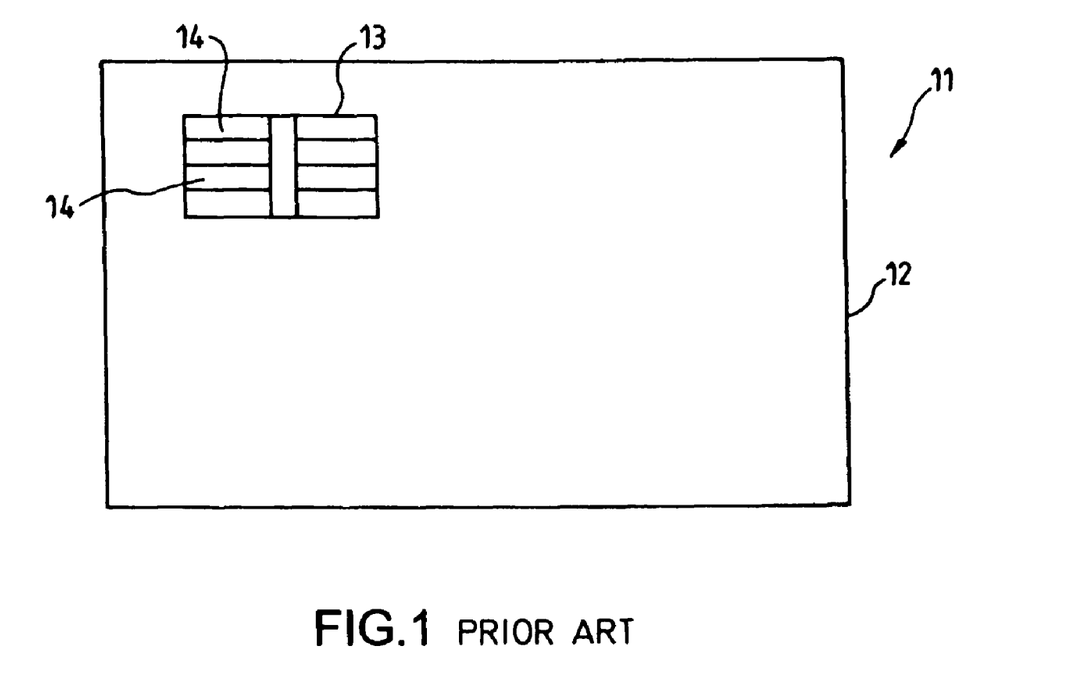
FIG. 1 illustrates an example of a smartcard according to prior art.

FIG. 1 illustrates an example of a smartcard according to prior art. The smartcard 11 comprises a plastic card 12 and an embedded microchip 13 that allows to securely store secret information. The microchip 13 comprises pins 14 allowing to communicate with an outside device. The microchip 13 has a memory having a relatively small size: the smartcard may not allow to store an entire CRL.

However, it is possible to use a smartcard to check a signed CRL step by step for the presence of a determined certificate. This avoids storing the entire CRL in the memory of the smartcard.

Figure 2A:
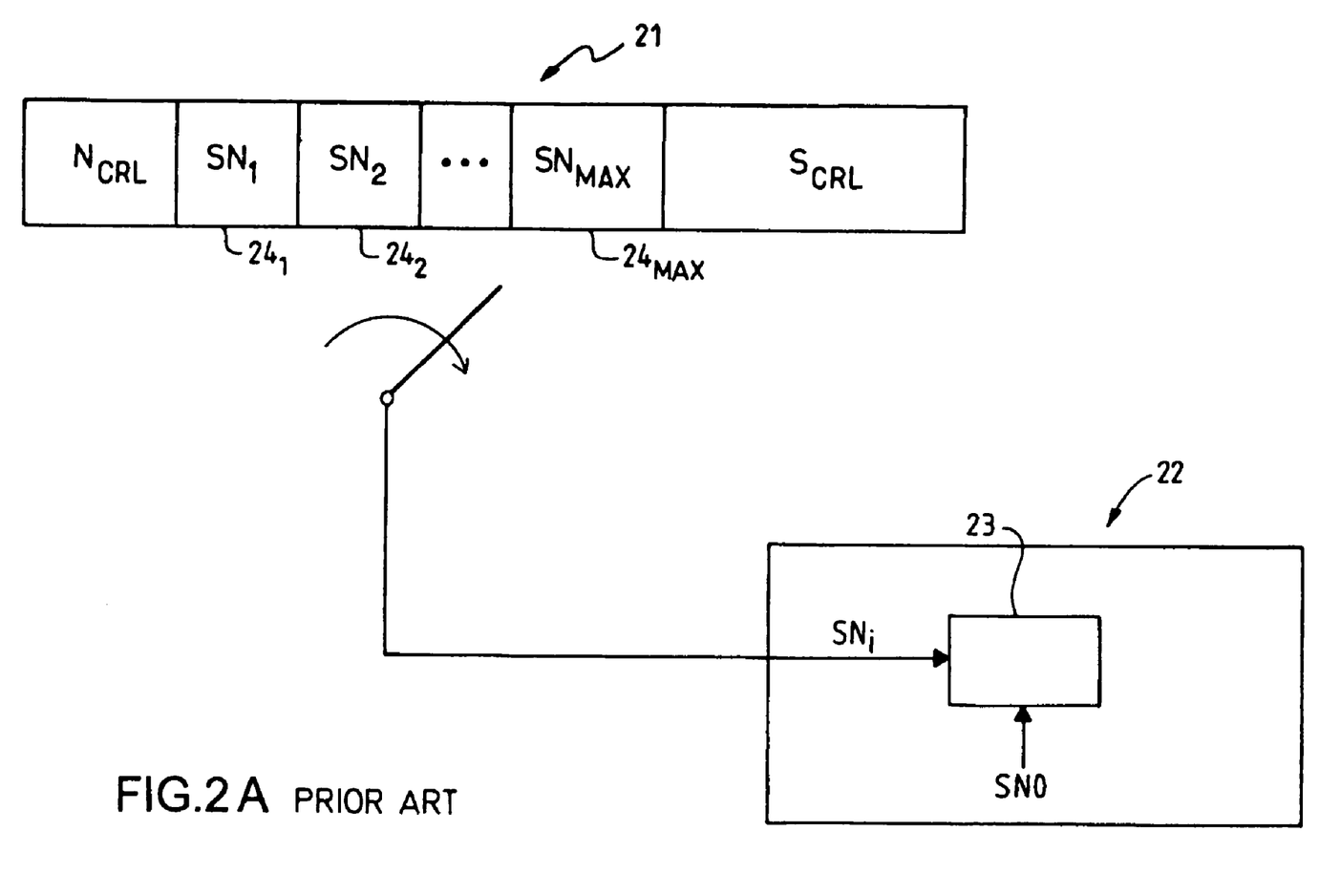
FIG. 2A illustrates an example of a method from prior art for checking a CRL with a smartcard.

FIG. 2A illustrates an example of a first method from prior art for checking a CRL with a smartcard. A CRL 21 is transmitted to a smartcard 22 in successive small blocks. Typically, the CRL 21 comprises a CRL identifier $N_{CRL}$, a CRL signature $S_{CRL}$ and a plurality of entries ($24_1, 24_2, \ldots, 24_{MAX}$), each entry comprising an associated revoked certificate serial number ($SN_1, SN_2, \ldots, SN_{MAX}$). Each transmitted small block may comprise one or many entries, each entry containing a single revoked certificate serial number $SN_i$. The smartcard 22 processes each small block to check if an entry corresponding to a determined certificate is present: typically, processing means 23 of the smartcard 22 compare a serial number SN0 of the determined certificate to the transmitted revoked certificate serial number $SN_i$.

In order to check the CRL signature $S_{CRL}$, the smartcard computes a hash value of the successively received small blocks. The hash function used in a generating of the CRL signature $S_{CRL}$ is designed so that the hash value can be computed block by block. After having received all the small blocks, i.e. the entire CRL, and obtained a total hash value, a verifying function is applied to this hash value, to a public key of the trusted third party that generated the signature and to the CRL signature $S_{CRL}$, thus allowing to check an integrity of the CRL. The checking of the integrity of the CRL needs to be repeated for every new certificate to be checked by the smartcard.

Figure 2B:
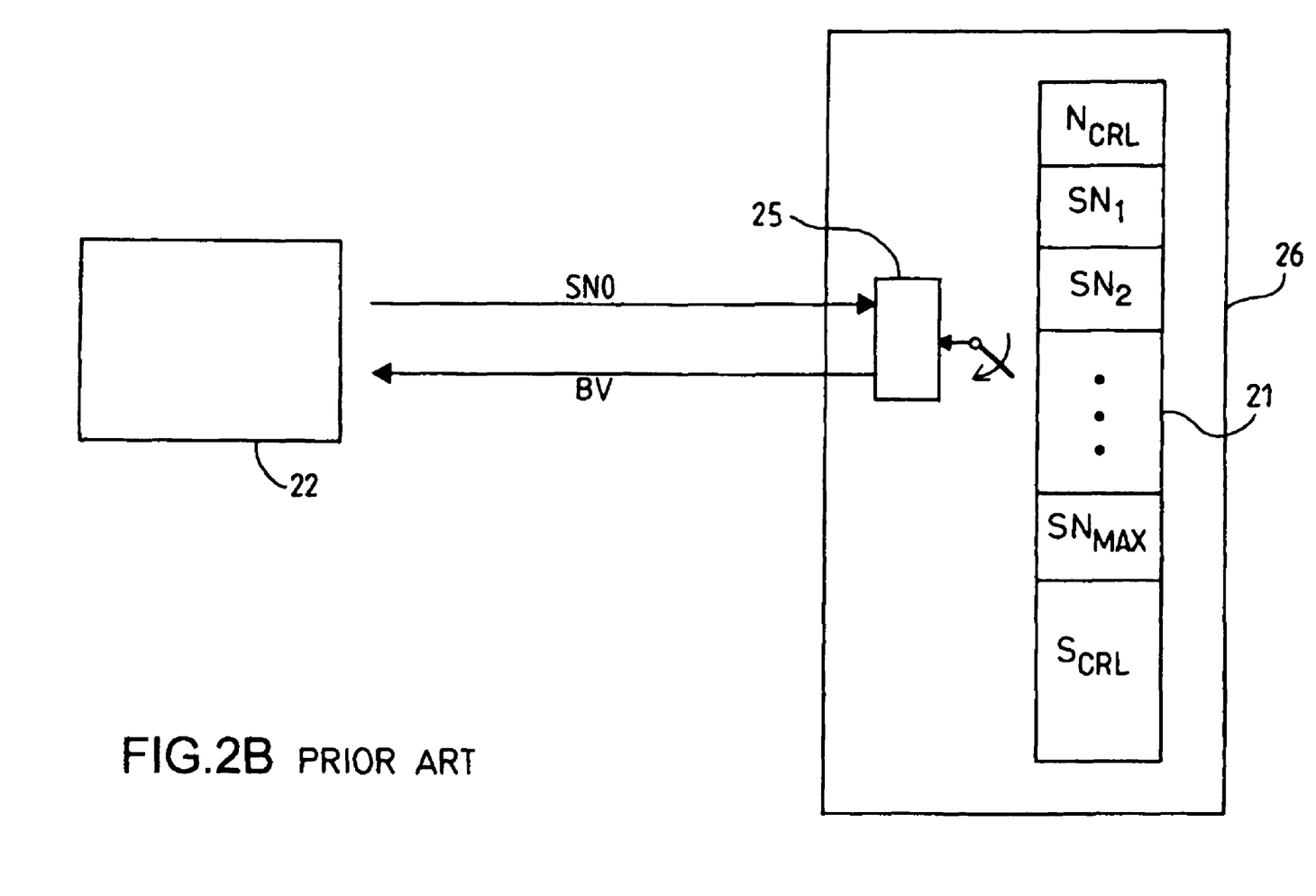
FIG. 2B illustrates an example of a second method from prior art for checking a validity of a determined certificate using a CRL.

FIG. 2B illustrates an example of a second method from prior art for checking a validity of a determined certificate using a CRL. A CRL 21 is stored in a host device 26, the host device being distinct from a smartcard 22. A certificate identifier SN0 of the determined certificate is transmitted from the smartcard 22 to the host device 26.

Processing means 25 of the second device 26 look up for the certificate identifier SN0 among revoked certificate identifiers ($SN_1, SN_2, \ldots, SN_{MAX}$) of the CRL 21 stored within the host device 26.

The host device 26 subsequently transmits to the smartcard 22 a result of the looking up that indicates whether the determined certificate is valid or not.

For example, if a relevant revoked certificate identifier equal to the transmitted certificate identifier SN0 is found within the CRL 21, the host device 26 assigns a first value to a Boolean variable BV, e.g. the Boolean variable BV is reset. If the processing means 25 fail to find any relevant certificate identifier equal to the transmitted certificate identifier SN0 within the CRL 21, the host device 26 assigns a second value to the Boolean variable BV, e.g. the Boolean variable BV is set.

The host device 26 transmits the Boolean variable BV to the smartcard 22. The value of the Boolean variable BV indicates to the smartcard 22 whether the CRL 21 comprises a relevant revoked certificate identifier equal to the certificate identifier to be checked SN0 or not. The determined certificate is hence evaluated as valid only if the transmitted Boolean variable BV is set. If the transmitted Boolean variable BV is reset, the determined certificate is evaluated as invalid.

The CRL 21 typically comprises a CRL identifier $N_{CRL}$ and a CRL signature $S_{CRL}$.

The smartcard 22 may also store the CRL identifier $N_{CRL}$; when a determined certificate needs to be checked, the smartcard 22 transmits the stored value of the CRL identifier $N_{CRL}$, thus allowing to check that the CRL 21 stored within the host device 26 is the CRL currently available.

The CRL signature $S_{CRL}$ allows to check an integrity of the CRL 21.

SUMMARY OF INVENTION

In a first aspect, the invention provides a method for managing a Certificate Revocation List (CRL). The CRL is received at the first device. The CRL comprises at least one revoked certificate identifier. An integrity field associated to an entry of the CRL is calculated using a secret data, wherein an entry comprises at least one revoked certificate identifier of the CRL. The entry and its associated calculated integrity field are transmitted to a second device, distinct from the first device. The method further comprises storing into the second device the transmitted entry and the associated integrity field.

In a first preferred embodiment, the partitioning of the Certificate Revocation List (CRL) into entries is performed in the first device.

In a second preferred embodiment, the integrity field is a message authentication code. A Certificate Revocation List (CRL) key to be associated with the received CRL is selected as the secret data and stored at the first device.

In a third preferred embodiment, the method further comprises applying a hash function to an intermediate data to calculate the message authentication code. The intermediate data is derived from the entry containing at least one revoked certificate identifier and from the CRL key.

In a fourth preferred embodiment, a plurality of revoked certificate identifiers is stored at the second device. The stored revoked certificate identifiers are organized in a list of at least one secured entry set. Each secured entry set comprises at least one revoked certificate identifier, at least one associated integrity field and a CRL identifier of the CRL. For each secured entry set a list order field is generated. The list order field has a content that allows to determine an order of the secured entry set within the list of secured entry sets stored in the second device.

In a fifth preferred embodiment, the CRL identifier of the CRL is stored into the first device.

In a sixth preferred embodiment, the method further comprises checking an integrity of the received CRL using a Certificate Revocation List (CRL) signature contained within the CRL and generated by a trusted third party which issued the CRL.

In a seventh preferred embodiment, the checking of the integrity of the received CRL comprises computing a hash value of the received CRL and applying a verifying function to the computed hash value, to a public key of the trusted third party and to the signature to evaluate the integrity of the CRL.

In an eighth preferred embodiment, a small block of the CRL is received at the first device. The small block of the CRL comprises at least one at least one revoked certificate identifier. At least one entry containing at least one revoked certificate identifier and the associated integrity field are transmitted to the second device. The received small block of the CRL is erased before any receiving of a further small block of the CRL.

Preferably the first device is a smartcard and the CRL identifier is a CRL serial number of the CRL.

In a ninth preferred embodiment, the method further comprises checking a validity of a certificate. A certificate identifier of the certificate is transmitted from the first device to the second device. A list of entries stored in the second device is examined to estimate whether the list comprises a relevant revoked certificate identifier having a value that corresponds to a value of the transmitted certificate identifier. At least one revoked certificate identifier and the associated integrity field are transmitted to the first device according to a result of the examining. The method further comprises verifying, at the first device, an integrity of the at least one transmitted revoked certificate identifier by using the associated transmitted integrity field and evaluating at the first device the validity of the certificate using at least the transmitted revoked certificate identifier.

In a tenth preferred embodiment, the CRL key is used to verify the integrity of the transmitted revoked certificate identifier.

In an eleventh preferred embodiment, each secured entry set of the list stored in the second device comprises a single revoked certificate identifier. At least a portion of a relevant secured entry set is transmitted to the first device. The relevant secured entry set contains the relevant revoked certificate identifier.

In a twelfth preferred embodiment, the method further comprises comparing at the first device a transmitted Certificate Revocation List (CRL) identifier contained within the transmitted secured entry set with an identifier of a determined CRL. The transmitted CRL identifier allows to ensure that the list stored in the second device corresponds to the determined CRL. The method further comprises checking at the first device that the relevant revoked certificate identifier is actually equal to the certificate identifier.

In a thirteenth preferred embodiment, each secured entry set of the list stored in the second device comprises a single revoked certificate identifier. The method further comprising transmitting to the first device at least a portion of a first secured entry set and at least a portion of a second secured entry set. The first secured entry set and the second secured entry set respectively contain revoked certificate identifiers having an order immediately before and after an expected order of the transmitted certificate identifier.

In a fourteenth preferred embodiment, transmitted Certificate Revocation List (CRL) identifiers contained within the transmitted secured entry sets are compared at the first device with an identifier of a determined CRL. The transmitted CRL identifiers allow to ensure that the list stored in the second device corresponds to the determined CRL. The method further comprises checking, at the first device, that the first secured entry set and the second secured entry set are consecutive within the list stored in the second device. The method further comprises checking at the first device that the first secured entry set and the second secured entry set respectively contain revoked certificate identifiers having an order immediately before and after the expected order of the transmitted certificate identifier.

In a fifteenth preferred embodiment, each secured entry set of the list comprises a plurality of revoked certificate identifiers. The plurality of revoked certificate identifiers is sorted within the secured entry set.

In a sixteenth preferred embodiment, at least a portion of a relevant secured entry set is transmitted to the first device. The relevant secured entry set contains the relevant revoked certificate identifier.

In a seventeenth preferred embodiment, the method further comprises looking up, in the second device, for an alternative secured entry set comprising a first revoked certificate identifier and a second revoked certificate identifier. The first revoked certificate identifier and the second revoked certificate identifier respectively have an order immediately before and after an expected order of the relevant certificate identifier. The alternative secured entry set is transmitted to the first device.

In an eighteenth preferred embodiment, a first alternative secured entry set and a second alternative secured entry set are transmitted to the first device. The first alternative secured entry set and the second alternative secured entry set respectively contain the first revoked certificate identifier and the second revoked certificate identifier.

In a nineteenth preferred embodiment, a transmitted Certificate Revocation List (CRL) identifier contained within the transmitted secured entry set is compared at the first device with an identifier of a determined CRL. The transmitted CRL identifier allows to ensure that the list stored in the second device (62) corresponds to the determined CRL.

In a twentieth preferred embodiment, the content of the list order field is an index, the index corresponding to the order of the secured entry set within the list. The first device stores a maximum index, the maximum index corresponding to the index of the last secured entry set of the list.

In a twenty-first preferred embodiment, the content of the list order field is an information about a preceding secured entry set within the list. The first device stores the first secured entry set and the last secured entry set of the list.

Preferably the certificate identifier is a certificate serial number.

In a third aspect, the invention provides a device for managing a Certificate Revocation List (CRL), said device comprising:

means for receiving a CRL, the CRL comprising at least one revoked certificate identifier;
means for calculating, an integrity field associated to an entry of the CRL using a secret data, wherein an entry comprises at least one revoked certificate identifier of the CRL; and
means for transmitting to a second device, distinct from said device, the entry and its associated calculated integrity field.

In a twenty-second preferred embodiment, the device further comprises:

means for transmitting to the second device a certificate identifier of a certificate to be checked;
means for receiving from the second device at least one entry containing at least one revoked certificate identifier and at least one associated integrity field;
means for verifying an integrity of the at least one transmitted revoked certificate identifier by using the associated transmitted integrity field; and
means for evaluating the validity of the certificate using at least the transmitted revoked certificate identifier.

In a fourth aspect, the invention provides a device for storing a Certificate Revocation List (CRL), said device comprising:

means for receiving, from a first device at least an entry containing at least one revoked certificate identifier of the CRL and an integrity field associated to the entry;
a memory for storing a plurality of revoked certificate identifiers, the stored revoked certificate identifiers being organized in a list of at least one secured entry set, each secured entry set comprising at least one revoked certificate identifier, at least one associated integrity field and a CRL identifier of the CRL; wherein each secured entry set comprises a list order field having a content that allows to determine an order of the secured entry set within the list of secured entry sets stored in said device.

In a twenty-third preferred embodiment, the device further comprises:

means for receiving a certificate identifier from a first device;
processing means for examining the list of entries stored in the memory so as to estimate whether the list comprises a relevant revoked certificate identifier having a value that corresponds to a value of the transmitted certificate identifier; and means for transmitting at least one revoked certificate identifier and the associated integrity field to the first device according to a result of the examining.

Other aspects and advantages of the invention will be apparent from the following description and the appended claims.

DETAILED DESCRIPTION

Checking a validity of a certificate is commonly performed by comparing an identifier of the certificate to be checked to identifiers of revoked certificates of a Certificate Revocation List (CRL).

A single device may comprise a memory for storing the CRL and processing means for performing the comparing.

Alternatively, the device may be memory limited: for example, a smartcard allows to protect the certificate to be checked and other secured data, but fails to store in its memory the entire CRL.

In a first method from prior art, the CRL is downloaded small block by small block into the device each time a certificate needs to be checked. Each downloaded small block is processed at the device and is erased before the downloading of a further small block. This may prove to be relatively time consuming.

In a second method from prior art, a host device stores the CRL and performs a looking up of a certificate identifier among the CRL. A result of the looking up, e.g. a Boolean variable, indicating whether the certificate to be checked is valid or not is transmitted to the device, e.g. a smartcard.

However, a hacker may transmit to the smartcard a false result of the looking up. The result of the looking up is altered such that the certificate is evaluated as valid. For example, the smartcard receives a false Boolean variable having a value indicating that the certificate is valid.

There is a need for a system and a method allowing a more secure checking of a validity of a certificate with a memory limited device.

Figures 3A, 3B:
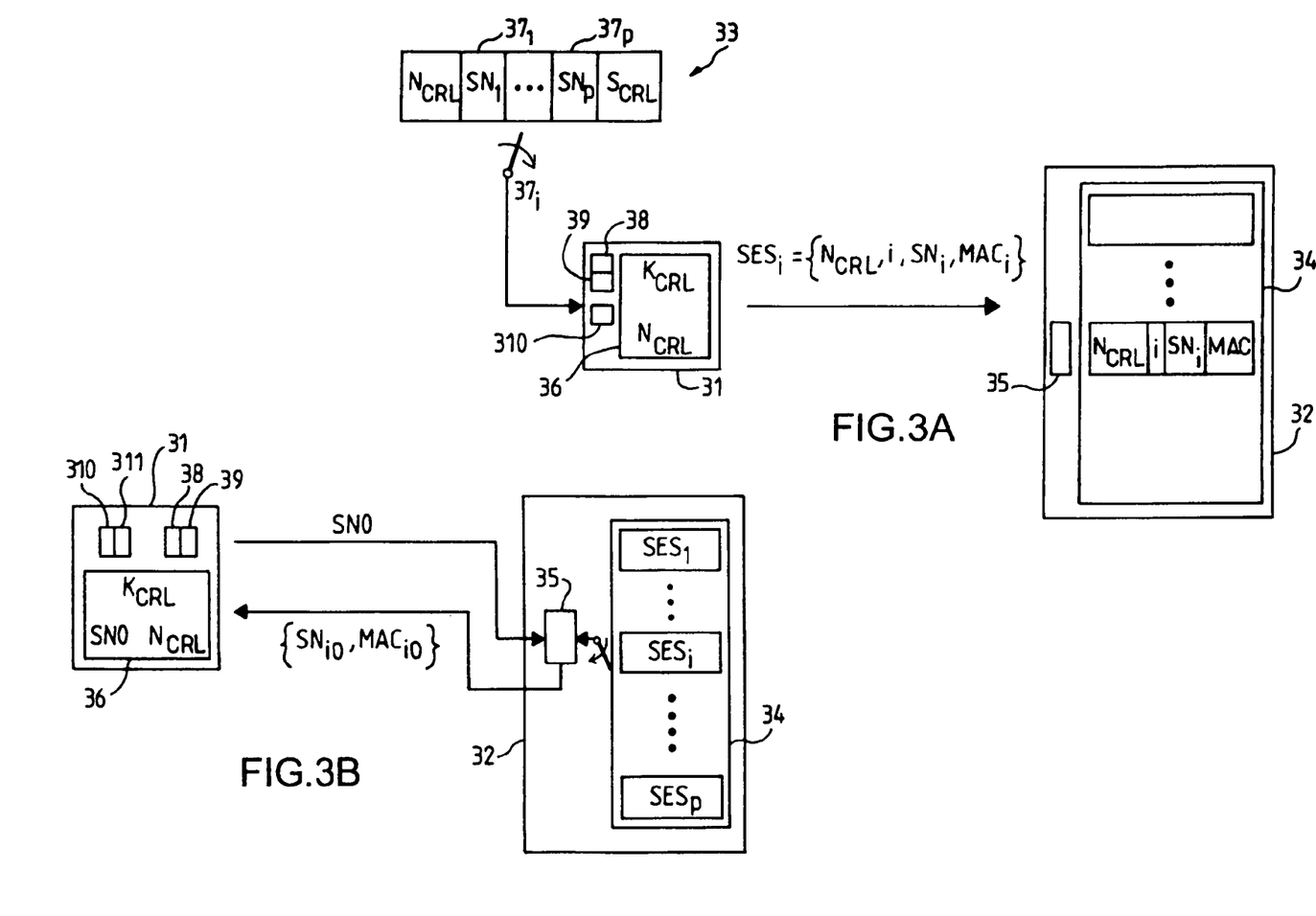
FIGS. 3A and 3B illustrate an example of a system of the present invention.

FIGS. 3A and 3B illustrate an example of a system according to the present invention.

The system comprises a first device 31 and a second device 32 distinct from the first device 31. As illustrated in FIG. 3A, the first device 31 initially receives a CRL 33, processes the received CRL and transmits the processed CRL to the second device 32. The second device 32 comprises a second memory 34 allowing to store the processed CRL.

The CRL 33 received at the first device comprises at least one revoked certificate identifier ($SN_1, \ldots, SN_p$).

The received CRL 33 is processed in the first device 31 to be partitioned into entries ($37_1, \ldots, 37_p$), each entry comprising at least one revoked certificate identifier and then, an integrity field ($MAC_i$) is calculated for each entry of the CRL. The calculating involves a secret data, e.g. a secret function, or a secret key.

The calculated integrity field ($MAC_i$) and the associated entry comprising at least a revoked certificate identifier ($SN_i$) are transmitted to and stored into the second device (32).

If a certificate having a certificate identifier SN0 needs to be evaluated, the certificate identifier SN0 is transmitted to the second device 32, as illustrated in FIG. 3B. Processing means 35 of the second device allow to examine the processed CRL stored in the second memory 34 so as to estimate whether the processed CRL comprises a relevant revoked certificate identifier having a value that equals a value of the certificate identifier SN0.

Alternatively, the processing means are part of a third device, the third device being distinct from the first device and from the second device.

The second device 32 outputs a result data to the first device 31 according to a result of the examining. The result data comprises at least one revoked certificate identifier $SN_{i0}$ of the list and the associated integrity field $MAC_{i0}$.

The transmitted integrity field $MAC_{i0}$ allows to verify an integrity of the associated revoked certificate identifier $SN_{i0}$.

The validity of the certificate SN0 is subsequently evaluated using the transmitted revoked certificate identifier $SN_{i0}$.

The system of the present invention allows to rapidly evaluate a validity of a certificate stored in a first device having a relatively small memory. The first device has to process a CRL only once, at an initial step, as illustrated in FIG. 3A. The processed CRL is stored in a second device, which allows to perform a looking up of a certificate identifier of the certificate at the second device.

The first method from prior art involving a small block by small block downloading of the CRL into the first device is more time consuming than the method of the present invention.

Furthermore, the method of the present invention comprises a verifying of an integrity of a transmitted result data, which allows to detect any change in a content of the transmitted revoked certificate identifier $SN_{i0}$. The method of the present invention hence allows to provide a more secure checking of the validity of the certificate than the second method from prior art.

Referring again to FIG. 3A, the CRL 33 is typically received at the first device 31 small block by small block. Each small block is processed and transmitted to the second device 32 before being erased at the first device 31.

In the example illustrated in FIG. 3A, each small block may comprise one or many revoked certificate identifiers ($SN_1, \ldots, SN_p$).

The processing of a received small block of the CRL 33 at the first device 31 consists in partitioning the small block into one or several entries $37_i$ (each entry comprising a single revoked certificate identifier or a plurality of revoked certificate identifiers) and generating a secured entry set $SES_i$ for each entry $37_i$. Each secured entry set $SES_i$ is transmitted to the second device 32 and stored within the second memory 34.

Each secured entry set $SES_i$ is generated from an associated entry 371. The secured entry set $SES_i$ comprises, in addition to the index i, at least one revoked certificate identifier $SN_i$ of the associated entry $37_i$, the integrity field $MAC_i$ calculated for the entry $37_i$, and the CRL identifier $N_{CRL}$ of the CRL 33.

The CRL identifier $N_{CRL}$ of the CRL is kept in a first memory 36 of the first device 31.

Preferably the integrity field is a message authentication code $MAC_i$. The message authentication code $MAC_i$ is calculated at the first device 31 from the revoked certificate identifier or identifiers $SN_i$ of the associated entry $37_i$ and from a CRL key $K_{CRL}$ selected at the first device 31.

The CRL key $K_{CRL}$ may be attached to a determined CRL and hence be replaced when a new CRL is received at the first device 31. Alternatively, the CRL key $K_{CRL}$ is attached to the first device 31 and remains at a same value.

Typically, the first device 31 comprises picking means 39 to pick the CRL key $K_{CRL}$ at random. A hash function is applied to an intermediate data to calculate the message authentication code $MAC_i$. The intermediate data is derived from the revoked certificate identifier or identifiers $SN_i$ of the associated entry $37_i$ and from a CRL key $K_{CRL}$.

For example, the intermediate data is stored in a binary form and comprises identifiers bits corresponding to the revoked certificate identifier or identifiers $SN_i$ of the associated entry $37_i$, followed by key bits corresponding to the CRL key $K_{CRL}$. The calculated message authentication code $MAC_i$ has a value that depends on both the revoked certificate identifier or identifiers $SN_i$ and the CRL key $K_{CRL}$.

Alternatively, the revoked certificate identifier or identifiers $SN_i$ of the entry are encrypted with the CRL key $K_{CRL}$ before or after an applying of the hash function.

The integrity field may also be calculated by applying a secret function to the revoked certificate identifier or identifiers $SN_i$ of the entry. The secret function may be kept at the first device.

More generally, the integrity field may be any other data allowing to verify an integrity of the revoked certificate identifier or identifiers $SN_i$ of the entry.

The calculating of the message authentication code $MAC_i$ may also involve other fields of the secured entry set $SES_i$, e.g. a list order field indicating an order of the secured entry set $SES_i$ within the list stored in the second device 32. The message authentication code $MAC_i$ hence possibly allow to verify an integrity of the secured entry set $SES_i$.

If a hacker succeeds in modifying a revoked certificate serial number $SN_i$ when transmitted between the first device 31 and the second device 32, the integrity field $MAC_i$ allows to detect the modifying.

The first device 31 may also check an integrity of the received CRL 33 itself, via a CRL signature $S_{CRL}$ contained within the CRL 33, this signature $S_{CRL}$ having been generated by the trusted third party that issued the CRL. Encrypting means 38 of the first device allow to compute a hash value of the received CRL 33. A hash function used in a generating of the CRL signature $S_{CRL}$ is designed so that the hash value can be computed block by block. A verifying function is then applied to the computed hash value, to a public key of the trusted third party and to the signature $S_{CRL}$ to evaluate the integrity of the CRL 33.

Unlike the method from prior art wherein the checking of the integrity of the CRL needs to be repeated for every new certificate to be checked, the method of the present invention requires to perform the checking only at the initial step, when a new CRL is downloaded.

The system illustrated in FIG. 3A allows to provide an access to the revoked certificate identifiers of the CRL from the first device 31. When a certificate needs to be evaluated, the certificate identifier SN0 is transmitted to the second device 32, as illustrated in FIG. 3B.

The certificate identifier SN0 is looked up among a list of the stored secured entry sets ($SES_1, \ldots, SES_i, \ldots, SES_p$). The second device 32 transmits at least a portion of at least one secured entry set $SES_{i0}$ to the first device 31 according to a result of the looking up. The transmitted portion comprises at least a revoked certificate identifier $SN_{i0}$ and an integrity field $MAC_{i0}$ of the secured entry set $SES_{i0}$.

Verifying means 311 of the first device 31 allow to verify an integrity of the transmitted revoked certificate identifier $SN_{i0}$.

The validity of the certificate is subsequently evaluated at evaluating means 310 of the first device 31 using at least the transmitted revoked certificate identifier $SN_{i0}$. The evaluating typically comprises comparing transmitted revoked certificate identifier $SN_{i0}$ to the identifier SN0 of the certificate to be checked.

If the transmitted revoked certificate identifier $SN_{i0}$ and the certificate identifier SN0 have a same value, the certificate is evaluated as invalid.

If the transmitted revoked certificate identifier $SN_{i0}$ and the certificate identifier SN0 have distinct values, the certificate is evaluated as valid.

However, the first device may perform additional tests to detect an attack performed by a hacker.

The attack may for example consist in an illegal modifying of an algorithm implemented within the second device. For example, a hacker modifies the host device such that the host device always outputs an old revoked certificate identifier and the associated message authentication code: in this case, there is very little chance that the certificate identifier SN0 be equal to the old revoked certificate identifier.

The hacker may also succeed in modifying a value of a certificate identifier of a revoked certificate to be checked, during a transmitting of the certificate identifier to the host device. The host device subsequently fails to find the relevant revoked certificate identifier.

The first device hence typically performs additional tests to detect a possible attack, such as a modifying of the algorithm executed by the host device, or a modifying of the value of the certificate identifier transmitted to the host device.

For example, if a difference value between the transmitted revoked certificate identifier $SN_{i0}$ and the certificate identifier SN0 is beyond a predetermined threshold, the first device may suspect an attack by a hacker.

The first device may also store a preceding revoked certificate identifier received from the host device at a checking of a distinct certificate: if the transmitted revoked certificate identifier $SN_{i0}$ has a same value than the stored preceding revoked certificate identifier, the certificate may be evaluated as invalid.

A preferred method allowing to detect a possible modifying of the algorithm executed by the host device or of the transmitted certificate identifier SN0 is described in a further paragraph of the present description.

Preferably the first device 31 is a smartcard. The certificate to be checked may be attached to the smartcard: for example, the certificate is downloaded into the smartcard at a manufacturing of the smartcard. Alternatively, the certificate is regularly replaced.

Preferably the CRL identifier $N_{CRL}$ is a CRL serial number of the CRL.

Alternatively, the CRL identifier $N_{CRL}$ is a date of issue of the CRL.

Preferably each certificate identifier is a serial number of a revoked certificate, or a portion of the serial number.

Alternatively, the certificate identifier may be the certificate itself.

The certificate identifier may be any data that allows to identify the corresponding certificate.

The picking means 39, the encrypting means 38, the evaluating means 310 and the verifying means 311 may be, as represented in FIGS. 3A and 3B, four distinct elements of the first device 31. However, the picking means, the encrypting means, the evaluating means and the verifying means are preferably part of a single processing unit, e.g. a microprocessor of the smartcard.

The picking means 39, the encrypting means 38, the evaluating means 310 and the verifying means 311 communicate with the first memory 36, e.g. a smartcard memory.

First Preferred Embodiment of the Present Invention

Figure 4:
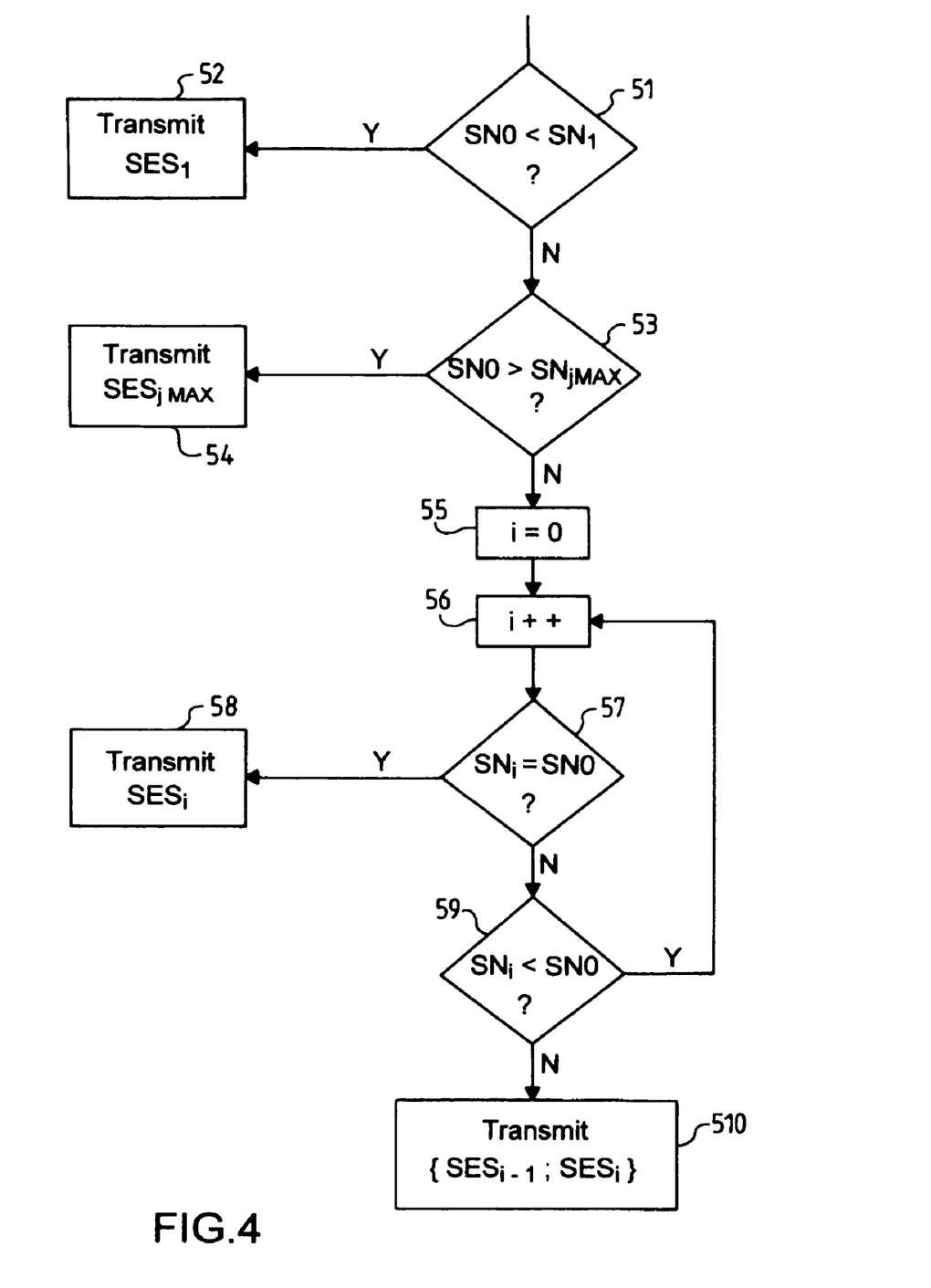
FIG. 4 illustrates an example algorithm to be executed by a host device in a system according to a first preferred embodiment of the present invention.

FIG. 4 illustrates an example algorithm to be executed by a host device in a system according to a first preferred embodiment of the present invention. The second device is a host device communicating with a first device, e.g. a smartcard.

The smartcard transmits a list of secured entry sets ($SES_1, \ldots, SES_j, \ldots, SESj_{MAX}$) to the host device during an initial step. Each secured entry set comprises a single revoked certificate serial number ($SN_1, \ldots, SN_j, \ldots, SN_{jMAX}$) and an associated message authentication code.

Each secured entry set ($SES_1, \ldots, SES_j, \ldots, SES_{jMAX}$) further comprises a list order field. The list order field comprises an information about a preceding secured entry set within the list. A first secured entry set SES, in the list comprises a list order field containing a predetermined value. The smartcard stores the first secured entry set SES, and a last secured entry set $SES_{jMAX}$. The content of the list order field hence allows to order the secured entry sets ($SES_1, \ldots, SES_j, \ldots, SES_{jMAX}$) of the list within the list.

Alternatively, the list order field contains an information about a following secured entry set within the list, the last secured entry set $SES_{jMAX}$ having a list order field filled with a predetermined value.

Alternatively the list order field comprises an index that corresponds to an order of the secured entry set within the list.

More generally, the list order field has a content that allows to determine an order of the secured entry set within the list.

The host device comprises a second memory that allows to store the list. In the first preferred embodiment of the present invention, the secured entry sets are sorted within the list in an increasing order regarding the revoked certificate serial numbers ($SN_1, \ldots, SN_j, \ldots, SN_{jMAX}$).

When a certificate needs to be checked, the smartcard transmits to the host device a certificate serial number SN0 of the certificate.

The host device examines the list to estimate whether the list comprises a relevant revoked certificate serial number having a value that equals a value of the transmitted certificate serial number SN0.

The transmitted certificate serial number SN0 is first compared to the first revoked certificate serial number $SN_1$ of the list (box 51).

If the transmitted certificate serial number SN0 is smaller than the first revoked certificate serial number $SN_1$, the host device transmits to the smartcard the first secured entry set $SES_1$ (box 52).

If the transmitted certificate serial number SN0 is greater than the first revoked certificate serial number $SN_1$, a second test is performed: the transmitted certificate serial number SN0 is compared to the last revoked certificate serial number $SN_{jMAX}$ of the list (box 53).

If the transmitted certificate serial number SN0 is greater than the last revoked certificate serial number $SN_{jMAX}$, the host device transmits to the smartcard the last secured entry set $SES_{jMAX}$ (box 54).

If the transmitted certificate serial number SN0 is greater than the first revoked certificate serial number $SN_1$ and smaller than the last revoked certificate serial number $SN_{jMAX}$, the host device resets an indexing variable i (box 55). The indexing variable is subsequently incremented (box 56).

It is further checked whether the transmitted certificate serial number SN0 equals a current revoked certificate serial number $SN_i$ corresponding to the current indexing variable i (box 57).

If the transmitted certificate serial number SN0 equals the current revoked certificate serial number $SN_i$, i.e. the list comprises the relevant revoked certificate serial number equal to the transmitted certificate serial number SN0, the host device transmits as a result data the relevant secured entry set $SES_i$ (box 58).

Otherwise, the current revoked certificate serial number $SN_i$ is compared to the transmitted certificate serial number SN0 (box 59) and if $SN_i$ is smaller than SN0, the indexing variable i is incremented (box 56).

If on the other hand $SN_i$ is greater than SN0, which means that SN0 is comprised between $SN_{i-1}$ and $SN_i$, the host device transmit as result data to the smart card two secured entry sets $SES_{i-1}$ and $SES_i$ corresponding to the two revoked certificate serial numbers that straddle the transmitted certificate serial number SN0 (box 510).

The looking up algorithm of the transmitted certificate serial number SN0 among the list that is illustrated in FIG. 4 is only an example. The looking up may be implemented with various algorithms.

Figure 5:
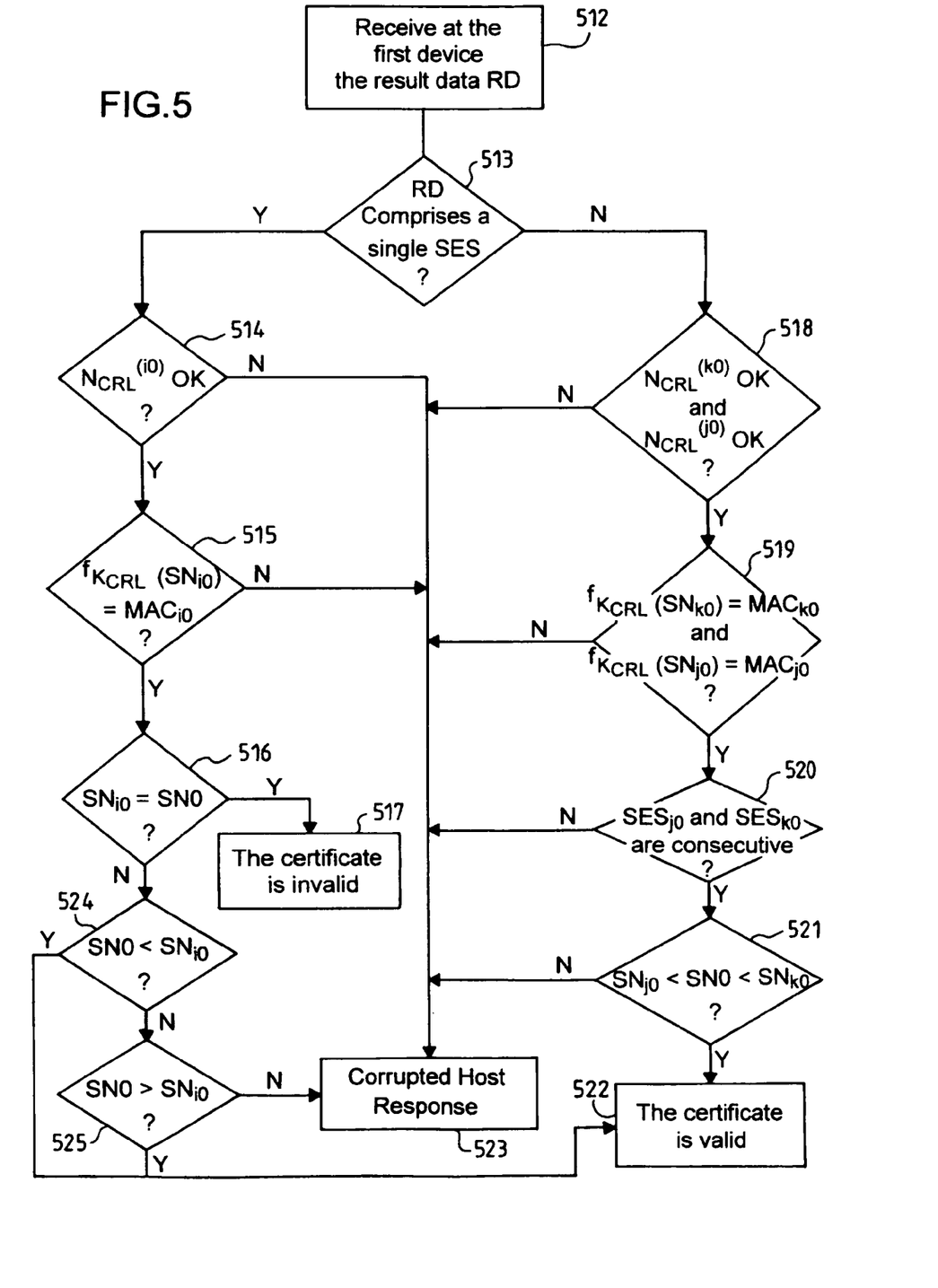
FIG. 5 illustrates an example algorithm to be executed by a smartcard in a system according to the first preferred embodiment of the present invention.

FIG. 5 illustrates an example algorithm to be executed by a smartcard in a system according to the first preferred embodiment of the present invention.

The smartcard communicates with a host device that performs a looking up of a certificate serial number SN0, and transmits a result data RD, as illustrated in FIG. 4. The smartcard receives the result data RD (box 512), i.e. one or two secured entry sets of a list stored in the host device.

The smartcard examines whether the result data RD comprises one or two secured entry sets (box 513).

If a single secured entry set $SES_{i0}$ is received as the result data, it is considered that the list stored in the host device comprises a relevant revoked certificate serial number $SN_{i0}$ equal to the certificate serial number SN0 or that one of the "limit" condition is met ($SES_{i0}=SES_1$ or $SES_{i0}=SES_{jMAX}$). A plurality of checks (boxes 514, 515 and 516) is then performed before evaluating the certificate as invalid (box 517).

A first checking (box 514) consists in verifying that a transmitted CRL identifier $N_{CRL}^{(i0)}$ contained within the received secured entry set $SES_{i0}$ equals a CRL identifier $N_{CRL}$ stored in the smartcard at an initial step. The first checking allows to insure that the list stored in the host device corresponds to the determined Certificate Revocation list (CRL) that is actually available.

A second checking (box 515) consists in verifying an integrity of the transmitted secured entry set $SES_{i0}$ from a message authentication code $MAC_{i0}$ contained within the transmitted secured entry set $SES_{i0}$ and from a CRL key $K_{CRL}$ stored in the smartcard. For example, the smartcard applies a hash function to an intermediate data deriving from the relevant revoked certificate serial number $SN_{i0}$ and from the CRL key $K_{CRL}$ stored in the smartcard, so as to obtain a verifying code of the relevant revoked certificate serial number $SN_{i0}$. The verifying code of the relevant revoked certificate serial number $SN_{i0}$ is compared to the message authentication code $MAC_{i0}$ contained within the transmitted secured entry set $SES_{i0}$: if distinct, it is considered that a content of the transmitted secured entry set $SES_{i0}$ is altered.

A third checking consists in verifying that the relevant revoked certificate serial number $SN_{i0}$ actually equals the certificate serial number SN0 (box 516).

If the three checks (boxes 514, 515 and 516) are successfully performed, the certificate is evaluated as invalid (box 517).

If in the third checking, $SN_{i0}$ is found different from the certificate serial number SN0, then a fourth checking is performed which consists in verifying whether SN0 is smaller than $SN_{i0}$ (box 524) which is the case only if $SES_{i0}=SES_1$. If this fourth checking is successful, the certificate having a serial number SN0 is considered valid (box 522). In the contrary, a fifth checking is performed to verify whether SN0 is greater than $SN_{i0}$ (box 525) which is the case only if $SES_{i0}=SES_{jMAX}$. If this fifth checking is successful, the certificate is evaluated as valid (box 522).

Otherwise, if any one of the checks performed in boxes 514, 515 or 525 is negative, the host response is considered corrupted (box 523). In this case, depending on the implementation chosen, the certificate may be evaluated as invalid or the whole process may be restarted: the smart card 31 transmits again the serial number SN0 of the certificate to be checked to the host 32 and waits for another result data. This request of result data from the host may be repeated until a maximum number of times is reached (e.g. two or three times).

Returning again to box 513, if, following the examining of the result data, it is estimated that the result data comprises a set of two transmitted secured entry sets, a plurality of checks are performed (boxes 518, 519, 520 and 521) before allowing any evaluating of the validity of the certificate (box 522).

Transmitted CRL identifiers $N_{CRL}^{(j0)}$ and $N_{CRL}^{(k0)}$ respectively contained within a first received secured entry set $SES_{j0}$ and within a second received secured entry set $SES_{k0}$ are compared to the CRL identifier $N_{CRL}$ stored in the smartcard (box 518). Such a sixth checking (box 518) allows to insure that the list stored in the host device corresponds to the determined Certificate Revocation list (CRL) that is actually available. If any one of the transmitted CRL identifiers $N_{CRL}^{(j0)}$ and $N_{CRL}^{(k0)}$ is distinct from the CRL identifier $N_{CRL}$ stored in the smartcard, it may be considered that the smartcard or the host device has been fraudulently replaced. The certificate may subsequently be considered as invalid.

The integrity of the first transmitted secured entry set $SES_{j0}$ is verified from the message authentication code $MAC_{j0}$ contained within the first transmitted secured entry set $SES_{j0}$ and from the CRL key $K_{CRL}$ stored in the smartcard (box 519). Such a seventh checking may be performed via a hash function: the hash function may for example be applied to an intermediate data that is derived from a transmitted first revoked certificate serial number $SN_{j0}$ and from the CRL key $K_{CRL}$, as in the second checking (box 515). If the seventh checking (box 519) leads to consider that a content of the first transmitted secured entry set $SES_{j0}$ is altered, the certificate may be evaluated as invalid.

Similarly, the integrity of the second transmitted secured entry set $SES_{k0}$ is verified from the message authentication code $MAC_{k0}$ contained within the second transmitted secured entry set $SES_{k0}$ and from the CRL key $K_{CRL}$ stored in the smartcard (box 519).

It is subsequently checked that the first transmitted secured entry set $SES_{j0}$ and the second transmitted secured entry set $SES_{k0}$ are actually consecutive within the list stored in the second device (box 520). Such a eighth checking (box 520) is typically performed using list order fields of the transmitted secured entry set $SES_{j0}$ and $SES_{k0}$.

If each list order field of a given secured entry set of the list comprises an information about a preceding secured entry set, as described in the first preferred embodiment, the eighth checking may consist in verifying that the information contained within the list order field of the second secured entry set $SES_{k0}$ actually corresponds to the first secured entry set $SES_{j0}$.

Alternatively, each list order field of a given secured entry set of the list comprises an index of the given secured entry set: in this case, the checking may simply consists in verifying that the indices associated to the first secured entry set $SES_{j0}$ and to the second secured entry set $SES_{k0}$ are actually consecutive.

Finally, the smartcard checks that the first secured entry set $SES_{j0}$ and the second secured entry set $SES_{k0}$ are respectively situated immediately before and after the relevant secured entry set within the list stored in the host device (box 521).

In the first preferred embodiment wherein the secured entry sets of the list are sorted in an increasing order regarding the revoked certificate serial numbers $(SN_1, \ldots, SN_j, \ldots, SN_{jMAX})$, the ninth checking (box 521) consists in verifying that the certificate serial number SN0 has a value between a value of a first revoked certificate serial number $SN_{j0}$ and a second revoked certificate serial number $SN_{k0}$, respectively contained within the first secured entry set $SES_{j0}$ and the second secured entry set $SES_{k0}$.

The sixth checking (box 518), the seventh checking (box 519), the eighth checking (box 520) and the ninth checking (box 521) allow to provide a more complete securing of the system. Indeed, the host device is typically an unprotected device: an hacker may not only alter data transmitted between the smartcard and the host device, but also access processing means of the host device and modify an implemented algorithm.

For example, with the second method from prior art, the hacker may modify the processing means such that a Boolean variable transmitted to the smartcard always have a same value, i.e. any certificate to be checked is evaluated as valid.

With a system according to the present invention, the hacker could modify the implemented algorithm such that, for any value of the transmitted certificate identifier SN0, a same couple of revoked certificate identifiers and the associated message authentication codes are always transmitted to the smartcard. Typically, the couple comprises old revoked certificate identifier, so as to ensure that any relatively recent certificate is evaluated as valid. However, the method according to the first preferred embodiment of the present invention allows to detect such a failure in the algorithm of the host device: in particular, the ninth checking (box 521) allows to realize that the couple of revoked certificate identifiers would actually not straddle the transmitted certificate identifier within the list. The certificate identifier may subsequently be evaluated as invalid. The smartcard may also be blocked or be forbidden to communicate with the host device.

If the sixth checking (box 518), the seventh checking (box 519), the eighth checking (box 520) and the ninth checking (box 521) are successfully performed, the certificate is evaluated as valid (box 522).

Otherwise, if any one of the checks performed in boxes 518, 519, 520 or 521 is negative, the host response is considered corrupted (box 523) which means either that the certificate is evaluated as invalid or that the process is started again as explained previously.

FIG. 5 illustrates only an example of an algorithm to be implemented within the smartcard. The checking (boxes 514, 515, 516, 518, 519, 520 and 521) may be performed following a different order. For example, the transmitted CRL identifier and the integrity of the transmitted secured entry set may be checked before examining whether the result data comprises one or two secured entry sets: the smartcard checks one transmitted CRL identifier and the integrity of a single transmitted secured entry set, whether the result data comprises one or two secured entry sets.

Second Preferred Embodiment of the Present Invention

Figure 6:
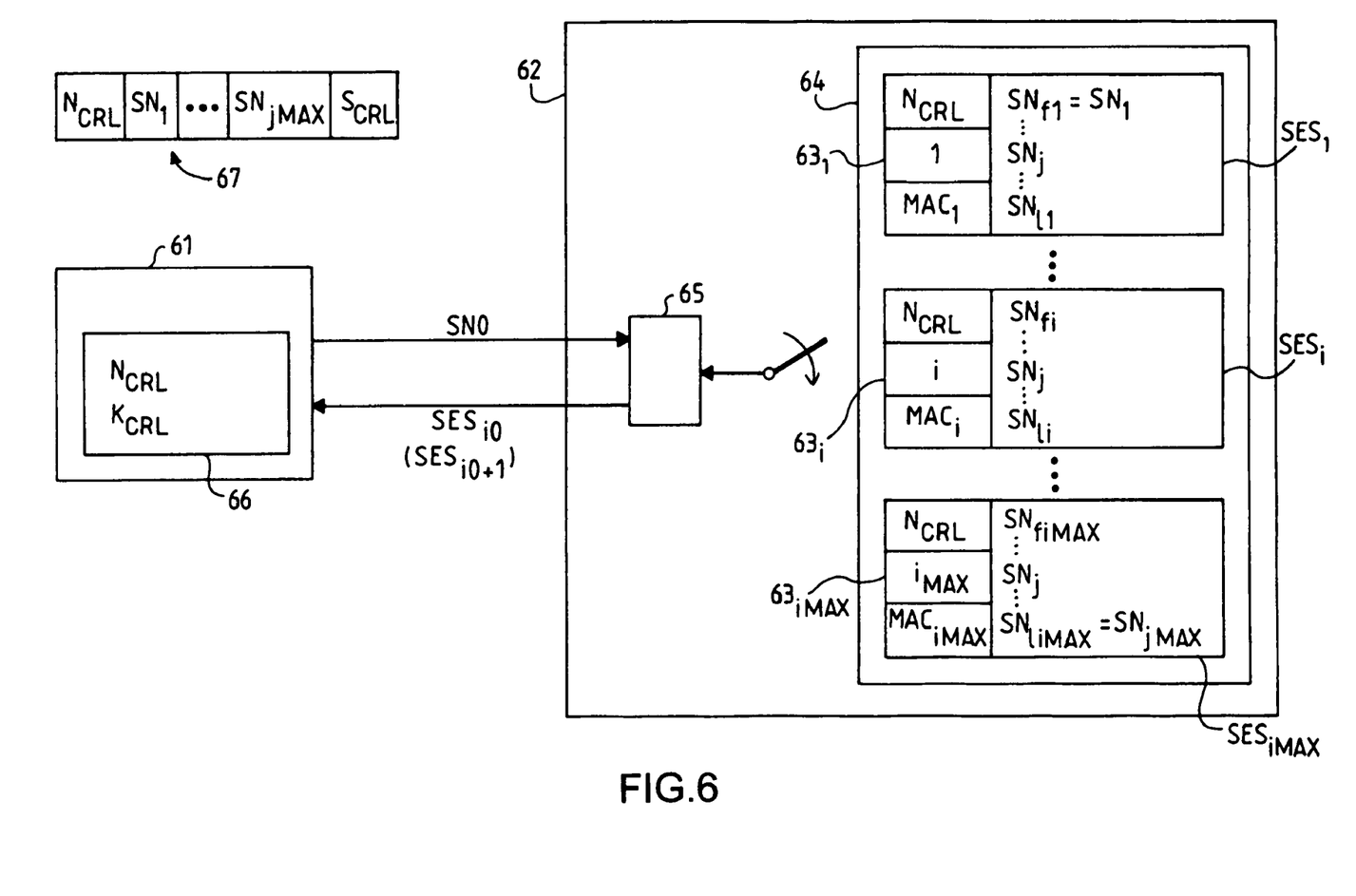
FIG. 6 illustrates an example of a system according to a second preferred embodiment of the present invention.

FIG. 6 illustrates an example of a system according to a second preferred embodiment of the present invention. The system comprises a first device, e.g. a smartcard 61 having a memory 66, and a second device communicating with the first device, e.g. a host device 62 having a memory 64 and processing means 65. A Certificate Revocation List (CRL) illustrated by reference 67 is first processed in the smart card 61 to generate secured entry sets $SES_i$, which are then stored in the host memory 64.

In the second preferred embodiment of the present invention, each secured entry set $SES_i$ is generated from a plurality of revoked certificate serial numbers $(SN_1, \ldots SN_{jMAX})$ of the CRL. Each secured entry set $SES_i$ may comprise a predetermined number of revoked certificate serial numbers (e.g. four) or the number of revoked certificate serial numbers per secured entry set may be variable.

Each secured entry set $SES_i$ comprises a CRL identifier $N_{CRL}$ that is characteristic of the CRL 67 from which the secured entry set is generated.

The secured entry sets also comprise a list order field $(63_1, \ldots, 63_i, \ldots, 63_{iMAX})$ defining an order between the secured entry sets $(SES_1, \ldots, SES_i, \ldots, SES_{iMAX})$, e.g. an index, as illustrated in FIG. 6.

The revoked certificate serial numbers $(SN_{fi}, \ldots SN_{li})$ of each single secured entry set $SES_i$ are also sorted within the secured entry set, e.g. in an increasing order from a first revoked certificate serial number $SN_{fi}$ to a last revoked certificate serial number $SN_{li}$, as illustrated in FIG. 6.

A message authentication code $(MAC_1, \ldots MAC_i, \ldots MAC_{iMAX})$ is further computed for each secured entry set $SES_i$ from the plurality of revoked certificate serial numbers $(SN_{fi}, \ldots SN_{li})$ of the secured entry set $SES_i$ and from the CRL key $K_{CRL}$. Alternatively, other fields of the secured entry set $SES_i$ may be used to compute the $MAC_i$ value.

The secured entry sets may further comprise additional fields, e.g. a field with a smartcard identifier of the smartcard the host device is supposed to work with.

The smartcard stores several parameters allowing a further checking of a result data received from the host device. Typically, the smartcard stores the CRL identifier $N_{CRL}$ that is characteristic of the determined CRL currently available, a CRL key $K_{CRL}$ used in calculating the message authentication codes $(MAC_1, \ldots, MAC_{16})$. A maximum index $i_{MAX}$ corresponding to a last secured entry set $SES_{iMAX}$ of the list and/or a predetermined number of revoked certificate serial numbers per secured entry set may also be stored in the smart card depending on the implementation chosen.

When the smartcard 61 needs to check the validity of a certificate having a certificate serial number SN0, the smartcard transmits the certificate serial number SN0 to the host device 62 and the host device performs a looking up of the certificate serial number SN0 among the list of secured entry sets $(SES_1, SES_i, \ldots, SES_{iMAX})$.

If the host device processing means 65 find that the list comprises a relevant secured entry set $SES_{i0}$ containing a relevant revoked serial number $SN_{i0}$ equal to the certificate serial number SN0, the relevant secured entry set is transmitted to the smartcard as the result data.

If, on the other hand, the host device processing means 65 fail to find any relevant secured entry set containing a relevant revoked certificate serial number equal to the certificate serial number SN0, the host device returns result data as explained bellow.

In a first alternative, we suppose that the revoked certificate serial numbers $(SN_1, \ldots SN_{iMAX})$ of the CRL 67 are stored in the secured entry sets $(SES_1, SES_i, \ldots, SES_{iMAX})$ without any redundancy. In this alternative:

- either the host processing means 65 can find a relevant secured entry set $SES_{i0}$ that contains two revoked certificate serial numbers $SN_j$ and $SN_{j+1}$ such that $SN_j<SN0<SN_{j+1}$ in which case the host 62 sends the relevant secured entry set $SES_{i0}$ as result data to the smart card 61;
- or the host processing means 65 find that the relevant certificate serial number SN0 is comprised between the last revoked certificate serial number $SN_{li0}$ of a secured entry set $SES_{i0}$ and the first revoked certificate serial number $SN_{fi0+1}$ of a following secured entry set $SES_{i0+1}$, in which case the host 62 sends the consecutive secured entry sets $SES_{i0}$ and $SES_{i0+1}$ as result data to the smart card 61.

In a second alternative, we suppose that the revoked certificate serial numbers $(SN_1, \ldots SN_{iMAX})$ of the CRL 67 are stored in the secured entry sets $(SES_1, \ldots, SES_i, \ldots, SES_{iMAX})$ such that each last revoked certificate serial numbers $SN_{li}$ of a given secured entry set $SES_i$ (except for the last secured entry set $SES_{iMAX}$) is also stored as the first revoked certificate serial numbers $SN_{fi+1}$ of the consecutive secured entry set $SES_{i+1}$, i.e. $SN_{li}=SN_{fi+1}$. In this second alternative, the host processing means 65 should always be able to find a relevant secured entry set $SES_{i0}$ that contains two revoked certificate serial numbers $SN_j$ and $SN_{j+1}$ such that $SN_j<SN0<SN_{j+1}$ in which case the host 62 sends the relevant secured entry set $SES_{i0}$ as result data to the smart card 61.

However, in the two above-mentioned alternatives, we may have "limit" conditions were the certificate serial number SN0 is smaller than the first revoked certificate serial number $SN_{f1}=SN_1$ of the first secured entry set $SES_1$ of the list, in which case the host device 62 transmits to the smartcard 61 the first secured entry set $SES_1$.

Similarly, another "limit" condition may be met in the two above-mentioned alternatives if the certificate serial number SN0 is greater than the last revoked certificate serial number $SN_{liMAX}=SN_{jMAX}$ of the last secured entry set $SES_{iMAX}$ of the list, in which case the host device 62 transmits to the smartcard 61 the last secured entry set $SES_{iMAX}$.

As described in the first preferred embodiment of the present invention, the smartcard 61 performs a plurality of checks upon a receiving of the result data.

In the second preferred embodiment, the result data comprises at least one secured entry set $SES_{i0}$ of the list. The smartcard 61 checks that the transmitted CRL identifier $N_{CRL}$ contained within the transmitted secured entry set is actually equal to the CRL identifier stored in the smartcard 61, thus allowing to insure that the list stored in the host device corresponds to an available CRL.

The integrity of the at least one transmitted secured entry set $SES_{i0}$ may also be verified from the associated message authentication code $MAC_{i0}$ and from the CRL key $K_{CRL}$ stored in the smartcard 61.

If the result data comprises a single secured entry set, the transmitted secured entry set may contain the relevant revoked certificate serial number equal to the certificate serial number SN0, it may contain two revoked certificate serial numbers $SN_j$ and $SN_{j+1}$ such that $SN_j<SN0<SN_{j+1}$, or if one of the "limit" conditions mentioned above is met, the transmitted secured entry set may be equal to $SES_1$ or to $SES_{iMAX}$. The smartcard hence determines whether the single secured entry set $SES_{i0}$ comprises the relevant certificate serial number SN0 or not.

In the former case, it is estimated that the certificate serial number SN0 is contained in the current Certificate Revocation List and that the corresponding certificate is invalid.

In the latter case, the smartcard checks that the single secured entry set received $SES_{i0}$ actually comprises two revoked certificate serial numbers $SN_j$ and $SN_{j+1}$ such that $SN_j<SN0<SN_{j+1}$, or that the certificate serial number SN0 is smaller than the first revoked certificate serial number $SN_{fi0}$ of the secured entry set $SES_{i0}$ (if $SES_{i0}=SES_1$) or that SN0 is greater than the last revoked certificate serial number $SN_{li0}$ of the secured entry set $SES_{i0}$ (if $SES_{i0}=SES_{iMAX}$).

If the result data received by the smart card comprises two secured entry sets $SES_{i0}$ and $SES_{i0+1}$, the smartcard 61 looks for the two revoked certificate serial numbers $SN_j$ and $SN_{j+1}$ such that $SN_j<SN0<SN_{j+1}$ among the revoked certificate serial numbers of the two secured entry sets.

When two revoked certificate serial numbers $SN_j$ and $SN_{j+1}$ have been identified within the result data, whether the result data comprises one or two secured entry sets, the smartcard checks that these two revoked certificate serial numbers $SN_j$ and $SN_{j+1}$ are actually consecutive within the list. The certificate is subsequently estimated as valid.

The certificate having the serial number SN0 is also estimated valid when one of the "limit" conditions is met, i.e. when the certificate serial number SN0 is smaller than the first revoked certificate serial number $SN_{fi0}$ of the received secured entry set $SES_{i0}$ (if $SES_{i0}=SES_1$) or when SN0 is greater than the last revoked certificate serial number $SN_{li0}$ of the secured entry set $SES_{i0}$ (if $SES_{i0}=SES_{iMAX}$).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for managing a Certificate Revocation List (CRL), the method comprising:
   receiving at a first device the CRL, the CRL comprising at least two revoked certificate identifiers, wherein the first device is a smartcard and at least one of the two revoked certificate identifiers is a serial number of a revoked certificate;
   partitioning the CRL into at least two entries, wherein each entry of the partitioned CRL comprises a plurality of certificate revocation identifiers of the CRL;
   calculating, at the first device, for each entry of the partitioned CRL, an integrity field associated with a respective entry of the CRL using a secret data, wherein each integrity field is a code used to authenticate the associated entry of the associated CRL independent of other entries in the associated CRL;
   transmitting to a second device, distinct from the first device, the at least two entries and the integrity fields associated with the at least two entries; and storing into the second device the transmitted entries and the associated integrity fields.

2. The method according to claim 1, wherein the partitioning of the Certificate Revocation List (CRL) into entries is performed in the first device.

3. The method according to claim 1, wherein
each of the integrity fields is a message authentication code;
the method further comprises:
selecting as the secret data a Certificate Revocation List (CRL) key to be associated with the received CRL;
storing at the first device the selected CRL key.

4. The method according to claim 3, further comprising:
applying a hash function to an intermediate data to calculate the message authentication code, the intermediate data being derived from the entry containing at least one revoked certificate identifier and from the CRL key.

5. The method according to claim 1, further comprising:
storing at the second device a plurality of revoked certificate identifiers, the stored revoked certificate identifiers being organized in a list of at least one secured entry set, each secured entry set comprising at least one revoked certificate identifier, at least one associated integrity field and a CRL identifier of the CRL;
generating for each secured entry set a list order field, the list order field having a content that facilitates determining an order of the secured entry set within the list of secured entry sets stored in the second device.

6. The method according to claim 5, further comprising:
storing into the first device the CRL identifier of the CRL.

7. The method according to claim 1, further comprising:
checking, at the first device, an integrity of the received CRL using a Certificate Revocation List (CRL) signature contained within the CRL and generated by a trusted third party which issued the CRL.

8. The method according to claim 7, wherein the checking of the integrity of
the received CRL comprises:
computing a hash value of the received CRL;
applying a verifying function to the computed hash value, to a public key of the trusted third party and to the signature to evaluate the integrity of the CRL.

9. The method according to claim 1, further comprising:
receiving at the first device a small block of the CRL, the small block of the CRL comprising at least one revoked certificate identifier; and
transmitting to the second device at least one entry containing at least one revoked certificate identifier and the associated integrity field;
erasing the received small block of the CRL before any receiving of a further small block of the CRL.

10. The method according to claim 5, wherein the CRL identifier is a CRL serial number of the CRL.

11. The method according to claim 1, further comprising:
checking a validity of a certificate, wherein the checking of the validity of the certificate comprises:
transmitting a certificate identifier of the certificate from the first device to the second device;
examining, at the second device, the list of entries stored in the second device, so as to estimate whether the list comprises a relevant revoked certificate identifier having a value that corresponds to a value of the transmitted certificate identifier;
transmitting at least one revoked certificate identifier and the associated integrity field to the first device according to a result of the examining;
verifying, at the first device, an integrity of the at least one transmitted revoked certificate identifier by using the associated transmitted integrity field; and
evaluating at the first device the validity of the certificate using at least the transmitted revoked certificate identifier.

12. The method according to claim 11, wherein the method further comprises:
using the CRL key to verify the integrity of the transmitted revoked certificate identifier.

13. The method according to claim 11, wherein:
each secured entry set of the list stored in the second device comprises a single revoked certificate identifier; the method further comprising:
transmitting to the first device at least a portion of a relevant secured entry set, the relevant secured entry set containing the relevant revoked certificate identifier.

14. The method according to claim 13, the method further comprising:
comparing at the first device a transmitted Certificate Revocation List (CRL) identifier contained within the transmitted secured entry set with an identifier of a determined CRL, the transmitted CRL identifier allowing to ensure that the list stored in the second device corresponds to the determined CRL;
checking at the first device that the relevant revoked certificate identifier is actually equal to the certificate identifier.

15. The method according to claim 11, wherein:
each secured entry set of the list stored in the second device comprises a single revoked certificate identifier;
the method further comprising:
transmitting to the first device at least a portion of a first secured entry set and at least a portion of a second secured entry set, the first secured entry set and the second secured entry set respectively containing revoked certificate identifiers having an order immediately before and after an expected order of the transmitted certificate identifier.

16. The method according to claim 15, the method further comprising the following steps performed at the first device:
comparing transmitted Certificate Revocation List (CRL) identifiers contained within the transmitted secured entry sets with an identifier of a determined CRL, the transmitted CRL identifiers ensuring that the list stored in the second device corresponds to the determined CRL;
checking that the first secured entry set and the second secured entry set are consecutive within the list stored in the second device; and
checking that the first secured entry set and the second secured entry set respectively contain revoked certificate identifiers having an order immediately before and after the expected order of the transmitted certificate identifier.

17. The method according to claim 11, wherein:
each secured entry set of the list comprises a plurality of revoked certificate identifiers, the plurality of revoked certificate identifiers being sorted within the secured entry set.

18. The method according to claim 17, further comprising:
transmitting to the first device at least a portion of a relevant secured entry set, the relevant secured entry set containing the relevant revoked certificate identifier.

19. The method according to claim 17, further comprising:
looking up, in the second device for an alternative secured entry set comprising a first revoked certificate identifier and a second revoked certificate identifier, the first revoked certificate identifier and the second revoked certificate identifier respectively having an order immediately before and after an expected order of the relevant certificate identifier; and transmitting to the first device the alternative secured entry set.

20. The method according to claim 19, further comprising:
transmitting to the first device a first alternative secured entry set and a second alternative secured entry set, the first alternative secured entry set and the second alternative secured entry set respectively containing the first revoked certificate identifier and the second revoked certificate identifier.

21. The method according to claim 18, further comprising:
comparing at the first device a transmitted Certificate Revocation List (CRL) identifier contained within the transmitted secured entry set with an identifier of a determined CRL, the transmitted CRL identifier ensuring that the list stored in the second device corresponds to the determined CRL.

22. The method according to claim 5, wherein:
the content of the list order field is an index, the index corresponding to the order of the secured entry set within the list;
the first device stores a maximum index, the maximum index corresponding to the index of the last secured entry set of the list.

23. The method according to claim 5, wherein:
the content of the list order field is an information about a preceding secured entry set within the list;
the first device stores the first secured entry set and the last secured entry set of the list.

24. A device for managing a Certificate Revocation List (CRL), said device comprising:
means for receiving a CRL, the CRL comprising at least two revoked certificate identifiers, wherein the device is a smartcard and at least one of the two revoked certificate identifiers is a serial number of a revoked certificate;
means for partitioning the CRL into at least two entries, wherein each entry of the partitioned CRL comprises a plurality of certificate revocation identifiers of the CRL;
means for calculating, for each entry of the CRL, an integrity field associated with a respective entry of the CRL, using a secret data, wherein each integrity field is a code used to authenticate the associated entry of the associated CRL independent of other entries in the associated CRL; and
means for transmitting to a second device, distinct from said device, the at least two entries and the integrity fields associated with the at least two entries, wherein the second device stores the at least two entries and the associated integrity fields.

25. The device according to claim 24, further comprising:
means for transmitting to said second device a certificate identifier of a certificate to be checked;
means for receiving from said second device at least one entry containing at least one revoked certificate identifier and at least one associated integrity field;
means for verifying an integrity of the at least one transmitted revoked certificate identifier by using the associated transmitted integrity field; and means for evaluating the validity of the certificate using at least the transmitted revoked certificate identifier.

26. A device for storing a Certificate Revocation List (CRL), said device comprising:
means for receiving, from a second device distinct from the device, at least two entries of a partitioned CRL, wherein each entry of the partitioned CRL comprises a plurality of certificate revocation identifiers of the CRL and an integrity field associated with each entry of the at least two entries, wherein each integrity field is a code used to authenticate the associated entry of the associated CRL independent of other entries of the associated CRL, and wherein the device is a smartcard;
a memory for storing, in the device, the plurality of revoked certificate identifiers, the stored revoked certificate identifiers being organized in a list of at least one secured entry set, each secured entry set comprising at least one revoked certificate identifier, at least one associated integrity field, and a CRL identifier, wherein the CRL identifier is a CRL serial number of the CRL;
wherein each secured entry set comprises a list order field having a content that facilitates determining an order of the secured entry set within the list of the at least one secured entry set stored in said device.

27. The device according to claim 26 further comprising:
means for receiving a certificate identifier from the second device;
processing means for examining the list of entries stored in the memory so as to estimate whether the list comprises a relevant revoked certificate identifier having a value that corresponds to a value of the transmitted certificate identifier; and
means for transmitting at least one revoked certificate identifier and the associated integrity field to the second device according to a result of the examining.

28. A method for verifying a certificate, comprising:
at a first device:
receiving a Certificate Revocation List (CRL), the CRL comprising at least two revoked certificate identifiers, wherein the first device is a smartcard and at least one of the two revoked certificate identifiers is a serial number of a revoked certificate;
partitioning the CRL into at least two entries, wherein each entry of the partitioned CRL comprises a plurality of certificate revocation identifiers of the CRL;
calculating for each entry of the partitioned CRL, an integrity field associated with a respective entry of the CRL using a secret data, wherein each integrity field is a code used to authenticate the associated entry of the associated CRL independent of other entries in the associated CRL;
transmitting to a second device, distinct from the first device, the at least two entries and the integrity fields associated with the at least two entries;
transmitting an identifier of the certificate to the second device;
receiving from the second device at least an identifier of a revoked certificate and an integrity field; and
verifying that the certificate is valid if the identifier of the certificate is not equal to the identifier of the revoked certificate.

* * * * *